(12) United States Patent
Pickelsimer et al.

(10) Patent No.: US 8,837,915 B2
(45) Date of Patent: Sep. 16, 2014

(54) PERSONALIZED RECORDINGS INCLUDING BOOKMARKS

(75) Inventors: Lisa A. Pickelsimer, Atlanta, GA (US); Yousef Wasef Nijim, Roswell, GA (US); Anant Patil, Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 78 days.

(21) Appl. No.: 13/093,983

(22) Filed: Apr. 26, 2011

(65) Prior Publication Data

US 2012/0275762 A1 Nov. 1, 2012

(51) Int. Cl.
*H04N 5/76* (2006.01)
*H04N 5/92* (2006.01)
*H04N 9/80* (2006.01)
*H04N 5/93* (2006.01)
*G11B 27/00* (2006.01)

(52) U.S. Cl.
USPC ........... 386/291; 386/239; 386/278; 386/297; 386/299; 386/326

(58) Field of Classification Search
USPC .................. 386/239, 278, 291, 297, 299, 326
See application file for complete search history.

(56) References Cited

U.S. PATENT DOCUMENTS

| | | | | |
|---|---|---|---|---|
| 7,088,910 B2 * | 8/2006 | Potrebic et al. | ............... | 386/291 |
| 7,673,314 B2 * | 3/2010 | Ellis et al. | ........................ | 725/46 |
| 8,082,507 B2 * | 12/2011 | Speicher et al. | .............. | 715/740 |
| 8,244,102 B2 * | 8/2012 | Bhogal et al. | .................. | 386/263 |
| 2006/0020627 A1 * | 1/2006 | Poslinski | ................... | 707/104.1 |
| 2007/0248322 A1 * | 10/2007 | Hamada et al. | .................. | 386/95 |
| 2008/0010518 A1 * | 1/2008 | Jiang et al. | ....................... | 714/21 |
| 2010/0313238 A1 * | 12/2010 | Baumgartner et al. | ........ | 725/153 |

* cited by examiner

*Primary Examiner* — Daquan Zhao
(74) *Attorney, Agent, or Firm* — Merchant & Gould

(57) ABSTRACT

Personalized recordings may be provided. A first request to record an asset may be received. The first request may be associated with a first user and may include at least one first option. Next, a second request to record the asset may be received. The second request may be associated with a second user and may include at least one second option. Then the asset may be recorded consistent with the at least one first option and the least one second option. Next, a "my recordings list" associated with the first user may be displayed. In response to the displayed "my recordings" list associated with the first user, a request to play the asset may then be received. Next, in response to the received request to play the asset, the asset may be played consistent with the at least one first option.

23 Claims, 3 Drawing Sheets

PERSONALIZED RECORDINGS INCLUDING BOOKMARKS

BACKGROUND

Cable television is a system of providing television to consumers via signals transmitted to a television set through fixed optical fibers or coaxial cables. A set-top box (STB) may be used to convert the cable television signals to ones usable by the television set. A digital video recorder (DVR) may be used in conjunction with a STB. The DVR may record video in a digital format to a disk drive, USB flash drive, memory card, or other memory medium within the DVR.

SUMMARY OF THE INVENTION

Personalized recordings may be provided. A first request to record an asset may be received. The first request may be associated with a first user and may include at least one first option. Next, a second request to record the asset may be received. The second request may be associated with a second user and may include at least one second option. Then the asset may be recorded consistent with the at least one first option and the least one second option. Next, a "my recordings list" associated with the first user may be displayed. In response to the displayed "my recordings list" associated with the first user, a request to play the asset may then be received. Next, in response to the received request to play the asset, the asset may be played consistent with the at least one first option.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
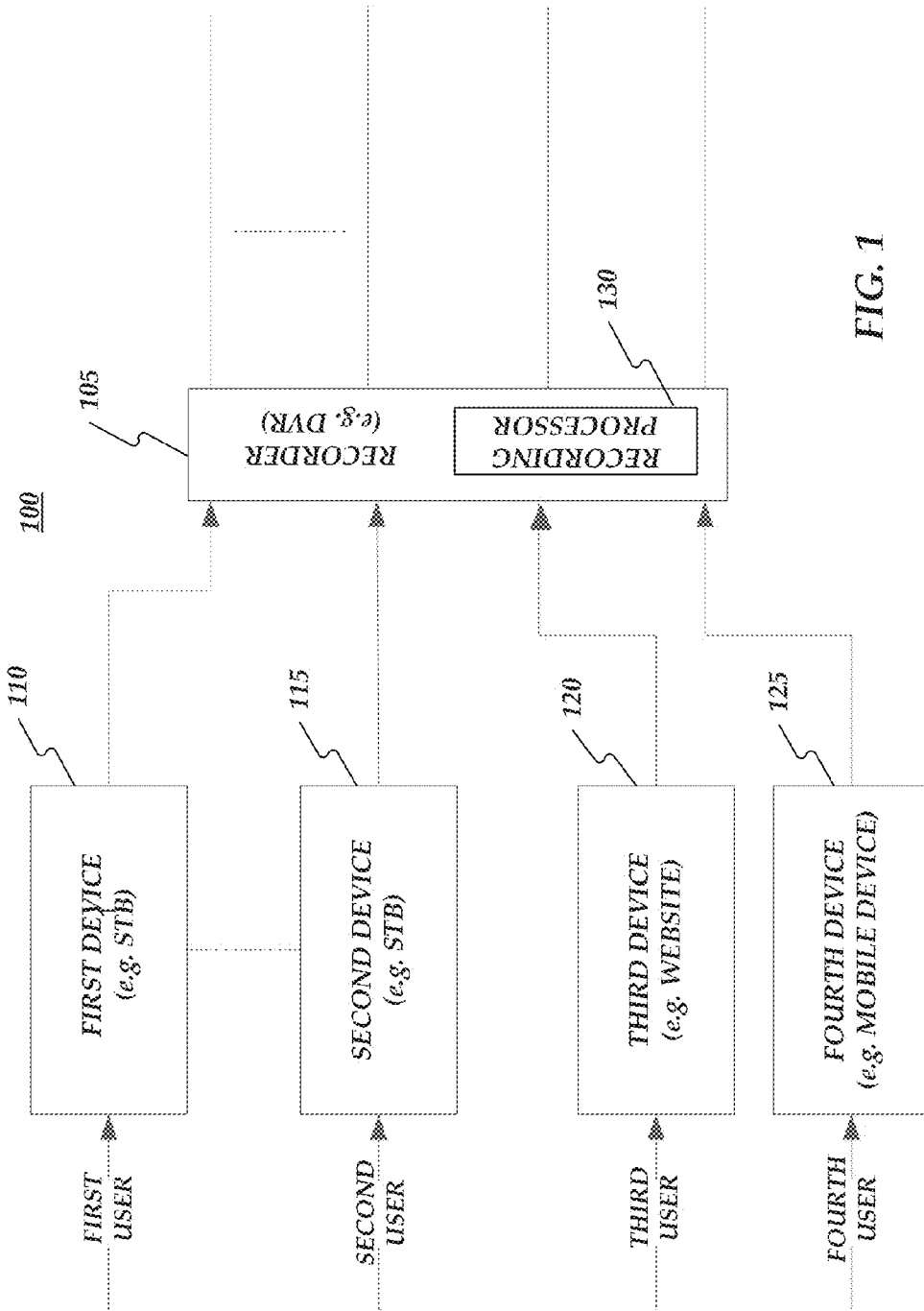
FIG. 1 is a block diagram of a multi-room recording environment including a recording processor.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the invention, users may personalize their recoding experience using a recording device such as a DVR. This personalize recording experience may be consistent across a multi-room recording environment as described in greater detail below. For example, a first user may be able to schedule a recording based on the first user's chosen set of options while a second user might schedule recording the same asset, but with different options. Each user may be able to filter an aggregated scheduled recording list to display scheduled recordings from that user in a personalized list for that user. The personalized list could be called "My Scheduled Recordings List" that may contain only assets scheduled by the user with the user's set of options. If more than one user schedules a recording of the same asset, only one instance of the asset may be recorded and saved. Accordingly, links to the recorded asset may be made available in the "My Scheduled Recordings List" in the profiles of all users who scheduled a recording of that asset.

Additionally, the users may see that asset recordings were missed related to what the users scheduled. Messaging of the missed recordings may be personalized per user. For example, the messaging may only indicate the assets that were not recorded for a particular user. Asset recordings may be missed due to, for example, all tuners on the recording device (e.g. DVR) being busy at a time the asset was scheduled by the user for recording.

Furthermore, consistent with embodiments of the invention, each user may record the asset based on user-specific desired options. All options associated with the user may be saved for that particular user. For example, the first user may schedule recording an asset titled "title A" with options comprising: i) 10 minutes to be recorded after the asset ends; and ii) auto delete from the hard drive. The second user may schedule recording the asset titled "title A" (i.e. the same asset as the first user recorded) with an option for manual deletion. Consistent with embodiments of the invention, the first user may see the first user's options (e.g. record 10 minutes after the show with auto delete) in the first user's "My Scheduled Recordings List" associated with "title A". Likewise, the second user may see the second user's options (e.g. manual deletion) in the second user's "My Scheduled Recordings List" associated with "title A". Moreover, the users may establish and/or change (edit) their options after the asset is recorded, for example.

Consistent with embodiments of the invention, after an asset has been recorded, the user may be able to filter, for example, an aggregated recorded assets list to display a recordings list that may be unique to the user (e.g. the user's "My Recordings List".) The displayed list could be called "My Recordings List" and may include a list of assets the user had recorded along with options the user specified for particular assets. Even though the asset may have been recorded with options different or broader (e.g. included in the aggregated recorded assets list) than the user specified options, the "My Recordings List" for this particular user may just include the options the user specified.

In addition, personalize asset bookmarks on a per user basis in the multi-room recording environment may be included with embodiments of the invention. When a user is viewing an asset, a bookmark unique to the user may be linked to a location in the asset. For example, if the first user is watching an asset called "title A", and the first user stops the asset at 50 minutes into the asset, a bookmark at 50 minutes may be associated with this asset for the first user. Consequently, the next time the first user access "title A", this asset may start playing at this 50 minute book mark. Even though only one instance of "title A" may be recorded, if the second user starts this asset for the first time (for example), then "title A" may be played from the beginning and not from the first user's bookmark. The personalized asset bookmarks may be deployed across the multi-room recording environment. Table 1 shows bookmarks for different users.

TABLE 1

| Title | User1 | User2 | User3 |
| --- | --- | --- | --- |
| Title A | Bookmark1 for Title A | Bookmark2 for Title A | Bookmark3 for Title A |
| Title B | Bookmark1 for Title B | Bookmark2 for Title B | Bookmark3 for Title B |
| Title C | Bookmark1 for Title C | Bookmark2 Title C | Bookmark3 Title C |

Consistent with embodiments of the invention, users may be able to delete titles from their "My Recordings List" without affecting other users who have the same title on their "My Recordings List". Furthermore, this title deletion may be performed without affecting any chosen options desired by each user. For example, when a user deletes a title from the user's "My Recordings List", a link to that title may be deleted from a recoding media (e.g. a hard drive) along with any chosen options. If the user is the only user who scheduled the recording of the asset, then the asset may be deleted from the recoding media. Users may be able to delete the assets manually from the recoding media if they are considered the master user or the one holding a parental control PIN. If this option is chosen, then a message may be displayed to the user notifying the user that other users recorded this asset. For example, the message may read "are you sure you want to delete this program? Users1-n has recorded the program as well".

Moreover, when users select from the options or change later auto delete including "save until I view" or "save until space is needed", the asset link may be deleted per user. For example, if the first user chooses "save until I view", then the link may be deleted (i.e. goes into an auto-delete queue to be deleted) to the asset when the asset is viewed (if other users recorded the same title.)

FIG. 1 is a block diagram of a multi-room recording environment 100, located, for example, in a house. As shown in FIG. 1, multi-room recording environment 100 may include a recorder 105 and a plurality of devices connected to recorder 105. The plurality of devices may comprise a first device 110, a second device 115, a third device 120, and a fourth device 125.

Recorder 105 may comprise a DVR and may include a recording processor 130 as described in greater detail below. First device 110 may comprise a first STB located in a first room (e.g. master bedroom) of a house. Second device 115 may comprise a second STB located in a second room of the house. Third device 120 may comprise a computer connected to recorder 105 through, but not limited to, a network (e.g. the Internet) a wired or wireless. Fourth device 125 may comprise a mobile phone connected to recorder 105 through, but not limited to, any one or more of a network (e.g. the Internet), a wire, a wireless network, or a cellular network. Notwithstanding, first device 110, second device 115, third device 120, and fourth device 125 may be connected to recorder 105 in any manner.

Consistent with embodiments of the invention the first user and the second user may use any one or more of the devices (e.g. first device 110, second device 115, third device 120, fourth device 125, or recorder 105) to schedule recorder 105 to record assets. The first user and the second user may interface with any one or more of the devices through displays and input elements associated with the devices. The assets to be recorded may comprise programs including, but not limited to, linear programs or on demand programs. The assets may be received by recorder 105 from, but not limited to, a cable television system, over-air broadcast, a network, or the internet.

Figure 2:
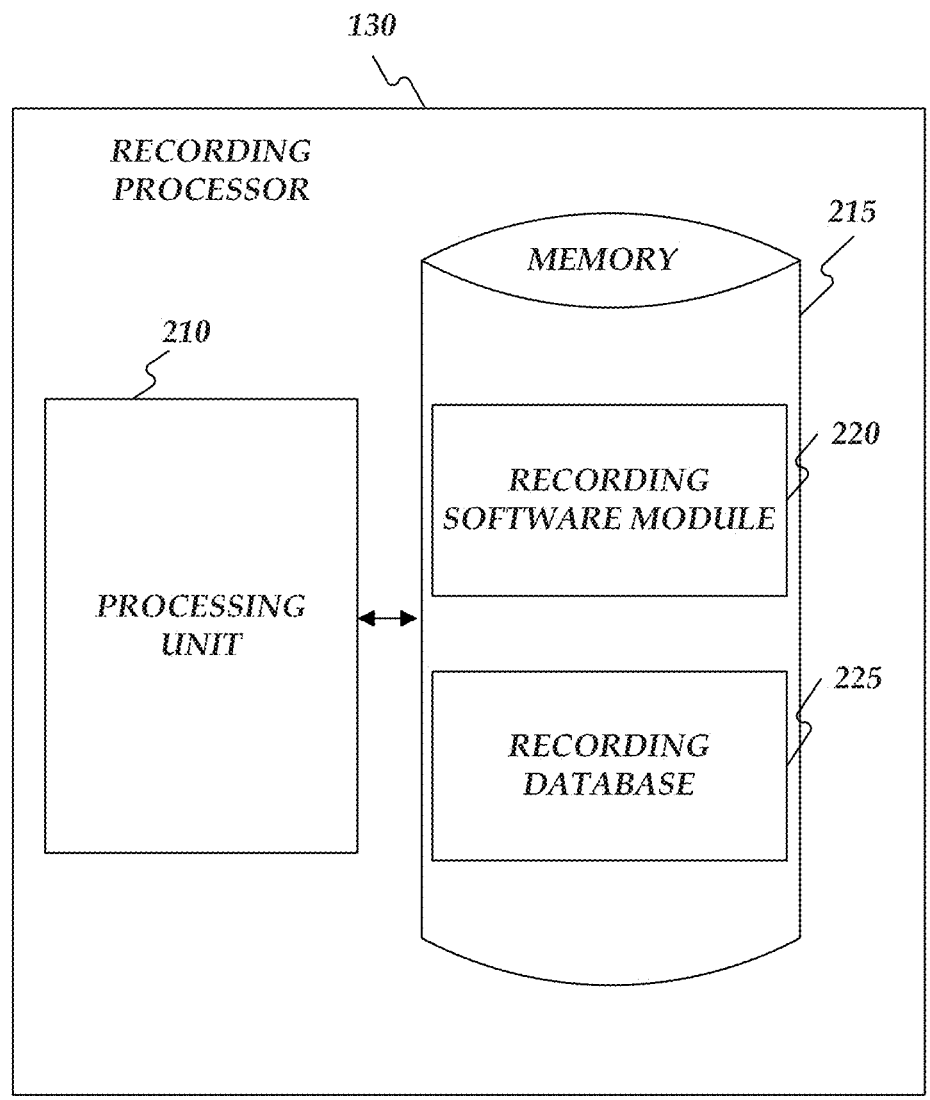
FIG. 2 is a block diagram of the recording processor.

FIG. 2 shows recording processor 130 of FIG. 1 in more detail. As shown in FIG. 2, recording processor 130 may include a processing unit 210 and a memory unit 215. Memory 215 may include a recording software module 220 and a recording database 225. While executing on processing unit 210, recording software module 220 may perform processes for providing personalized recordings, including, for example, one or more stages included in method 300 described below with respect to FIG. 3. Furthermore, any of recording processor 130, recording software module 220, and recording database 225 may be executed on or reside in any element shown in FIG. 1.

Recording processor 130 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
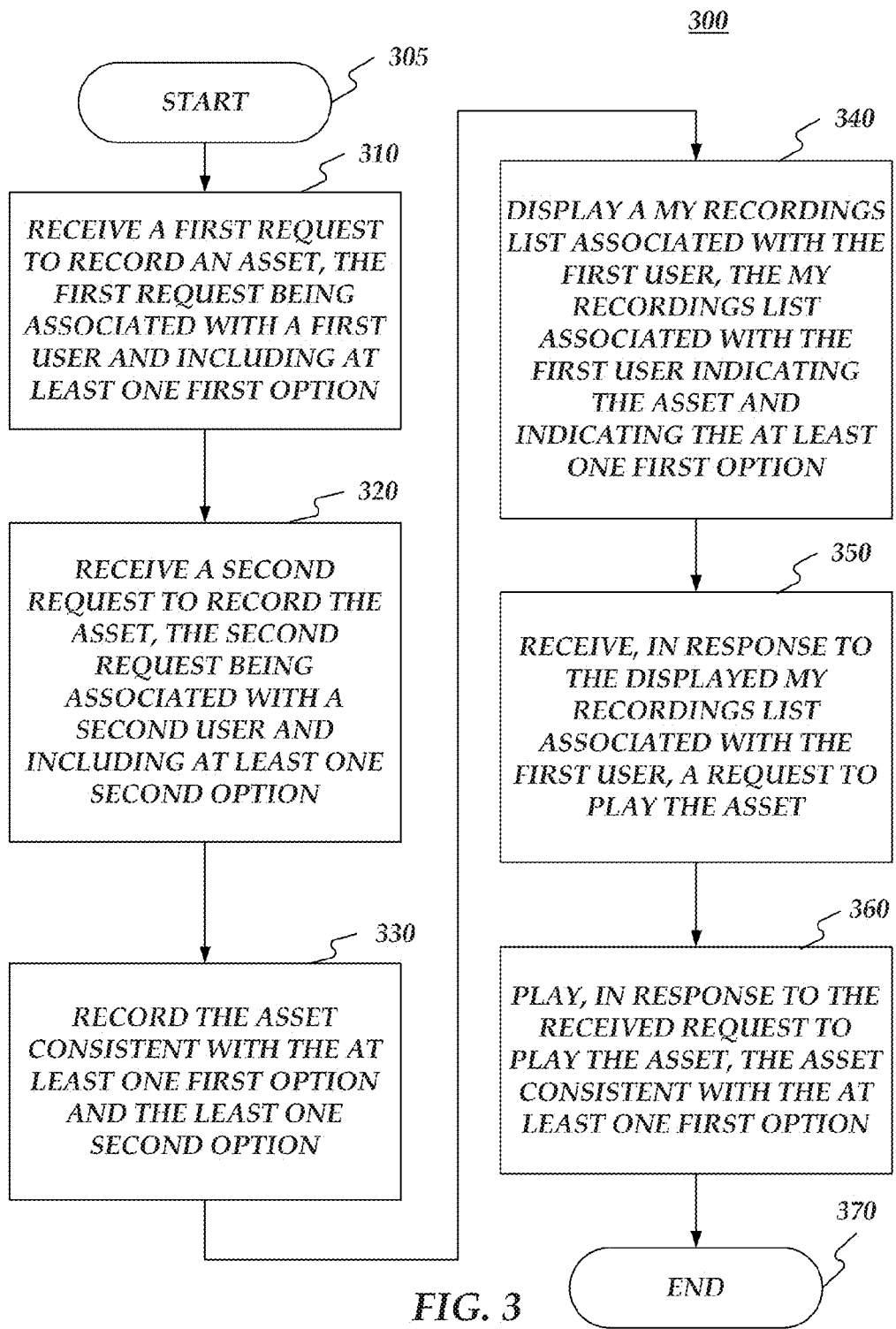
FIG. 3 is a flow chart of a method for providing personalized recordings.

FIG. 3 is a flow chart setting forth the general stages involved in a method 300 consistent with an embodiment of the invention for providing personalized recordings. Method 300 may be implemented using recording processor 130 as described in more detail above with respect to FIG. 2. Ways to implement the stages of method 300 will be described in greater detail below.

Method 300 may begin at starting block 305 and proceed to stage 310 where recording processor 130 may receive a first request to record an asset. The first request may be associated with the first user and may include at least one first option. For example, the first user may use any one or more of the devices (e.g. first device 110, second device 115, third device 120, fourth device 125, or recorder 105) to send the first request to recording processor 130 to schedule recorder 105 to record the asset. The at least one first option may comprise, but not limited to, time before the asset to record, time after the asset to record, and instructions for deleting the asset. For example, the at least one first option may specify that recorder 105 stop recording 10 minutes after the asset ends and/or start recording 10 minutes before the asset begins. Furthermore, the at least one first option may specify that recorder 105 auto delete or manual delete the asset from a recording media (e.g. a hard drive) on recorder 105. The aforementioned options are examples and the at least one first option may comprise any user-specific option desired by the first user.

From stage 310, where recording processor 130 receives the first request, method 300 may advance to stage 320 where recording processor 130 may receive a second request to record the asset. The second request may be associated with the second user and may include at least one second option. For example, the second user may use any one or more of the devices (e.g. first device 110, second device 115, third device 120, fourth device 125, or recorder 105) to send the second request to recording processor 130 to schedule recorder 105 to record the asset. The at least one second option may comprise, but not limited to, time before the asset to record, time after the asset to record, and instructions for deleting the asset. For example, the at least one second option may specify that recorder 105 stop recording 10 minutes after the asset ends and/or start recording 10 minutes before the asset begins. Furthermore, the at least one second option may specify that recorder 105 auto delete or manual delete the asset from a recording media (e.g. the hard drive) on recorder 105. The aforementioned options are examples and the at least one second option may comprise any user-specific option desired by the second user.

Once recording processor 130 receives the second request in stage 320, method 300 may continue to stage 330 where recording processor 130 may record the asset consistent with the at least one first option and the least one second option. For example, the first user may have scheduled recording the asset titled "title A" with the at least one first option comprising: i) 10 minutes to be recorded after the asset ends; and ii) auto delete from the hard drive. The second user may have schedule recording the asset titled "title A" (i.e. the same asset as the first user recorded) with the least one second option including manual deletion. In response to this, recorder 105 may record the asset in such a way as to cover and be consistent with the at least one first option and the least one second option.

After recording processor 130 records the asset in stage 330, method 300 may proceed to stage 340 where recording processor 130 may display a "My Recordings List" associated with the first user. The "My Recordings List" associated with the first user may be displayed on a display device associated with any one or more of the devices (e.g. first device 110, second device 115, third device 120, fourth device 125, or recorder 105). The "My Recordings List" associated with the first user may indicate the asset and may indicate the at least one first option. For example, the first user may see the first user's options (e.g. record 10 minutes after the show with auto delete) in the first user's "My Scheduled Recordings List" associated with "title A". Likewise, the second user may see the second user's options (e.g. manual deletion) in the second user's "My Recordings List" associated with "title A". Moreover, the users may establish and/or change (edit) their options after the asset has been recorded, for example. Even though the asset may have been recorded with options different or broader than the user specified options, the "My Recordings List" for each particular user may just include the options the particular user specified.

Once recording processor 130 displays the "My Recordings List" associated with the first user in stage 340, method 300 may continue to stage 350 where recording processor 130 may receive, in response to the displayed my recordings list associated with the first user, a request to play the asset. For example, from the displayed "My Recordings List", the user may use an input element and select the asset for play.

After recording processor 130 receives the request to play the asset in stage 350, method 300 may proceed to stage 360 where recording processor 130 may play, in response to the received request to play the asset, the asset consistent with the at least one first option. For example, recording processor 130 may play the asset on a display associated with any one of first device 110, second device 115, third device 120, fourth device 125, or recorder 105.

Moreover, when the first user is viewing the asset, a bookmark unique to the first user may be linked to a location in the asset. For example, if the first user is watching the asset called "title A", and the first user stops the asset at 50 minutes into the asset, a bookmark at 50 minutes may be associated with this asset for the first user. Consequently, the next time the first user access "title A", this asset may start playing at this 50 minute book mark. Even though only one instance of "title A" may have been recorded and saved on recorder 105, if the second user starts this asset for the first time (for example), then "title A" may be played from the beginning and not from the first user's bookmark. The personalized asset bookmarks may be deployed across the multi-room recording environment of FIG. 1. Once recording processor 130 plays the asset in stage 360, method 300 may then end at stage 370.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing personalized recordings, the method comprising:
   receiving a first request to record an asset on a recorder located in a multi-room recording environment, the first request being associated with a first user and including at least one first option specified by the first user;
   receiving a second request to record the asset on the recorder, the second request being associated with a second user from the multi-room recording environment and including at least one second option specified by the second user;
   recording a single instance of the asset on the recorder, wherein the asset is accessible to both the first user and the second user through the multi-room environment, wherein recording the single instance of the asset comprises recording the single instance of the asset consistent with both of the at least one first option and the least one second option; and
   displaying a my recordings list associated with the first user, the my recordings list associated with the first user comprising a listing of the asset and the at least one first option associated with the asset, wherein displaying the at least one option associated with the asset comprises a delete option comprising at least one of a manual delete option and an auto delete option.

2. The method of claim 1, further comprising creating a my recordings list associated with the second user, the my recordings list associated with the second user including a link to the asset with the at least one second option.

3. The method of claim 2, further comprising:
   receiving a request to stop playing the asset; and
   creating a bookmark corresponding to a point in the asset where play was stopped, the bookmark being unique to the first user.

4. The method of claim 1, further comprising:
   receiving, in response to the displayed my recordings list associated with the first user, a request to play the asset; and
   playing, in response to the received request to play the asset, the asset consistent with the at least one first option.

5. The method of claim 1, further comprising:
   receiving a request to edit the at least one first option; and
   editing the at least one first option in response to the received request to edit the at least one first option.

6. The method of claim 5, wherein receiving the request to edit the at least one first option comprises receiving the request to edit the at least one first option after the asset was recorded.

7. The method of claim 1, wherein receiving the first request to record the asset, the first request being associated with the first user and including the at least one first option, comprises receiving the first request wherein the at least one first option comprises instructions for the delete options for the asset.

8. The method of claim 7, wherein receiving the instructions for the delete option for the asset comprises receiving a set of conditions specified by the first user for the auto delete option.

9. The method of claim 1, wherein receiving the first request to record the asset, the first request being associated with the first user and including the at least one first option, comprises receiving the first request wherein the at least one first option comprises instructions on at least one of the following: time before the asset to record and time after the asset to record.

10. The method of claim 1, wherein receiving the first request to record the asset comprises receiving the first request to record the asset comprising an on demand program.

11. The method of claim 1, wherein receiving the first request to record the asset comprises receiving the first request to record the asset comprising a linear television program.

12. The method of claim 1, wherein listing the at least one missed recording comprises listing the at least one missed recording due to all tuners on a recording device being busy at a time the at least one missed recording was scheduled to be recorded.

13. The method of claim 1, wherein listing the at least one missed recording comprises listing the at least one missed recording due to a recording device lacking sufficient memory to store the at least one missed recording.

14. The method of claim 1, further comprising:
   deleting the asset from the my recording list associated with the first user, wherein deleting the asset from the recording list associated with the first user comprises deleting the asset from the recording list associated with the first user without affecting the at least one second option specified by the second user for the asset.

15. A non-transitory computer-readable medium which stores a set of instructions which when executed performs a method for providing personalized recordings, the method executed by the set of instructions comprising:
   receiving a first request to record an asset on a recorder located in a multi-room recording environment, the first request being associated with a first user and including at least one first option specified by the first user;
   receiving a second request to record the asset on the recorder, the second request being associated with a second user from the multi-room recording environment and including at least one second option specified by the second user;
   recording a single instance of the asset on the recorder, wherein the asset is accessible to both the first user and the second user through the multi-room environment, wherein recording the single instance of the asset comprises recording the single instance of the asset consistent with both of the at least one first option and the least one second option;
   displaying a my recordings list associated with the first user, the my recordings list associated with the first user comprising the asset and the at least one first option associated with the asset, wherein displaying the at least one option associated with the asset comprises a delete option comprising at least one of a manual delete option and an auto delete option;

receiving, in response to the displayed my recordings list associated with the first user, a request to play the asset; and playing, in response to the received request to play the asset, the asset consistent with the at least one first option.

16. The non-transitory computer-readable medium of claim 15, further comprising:

receiving a request to stop playing the asset; and creating a bookmark corresponding to a point in the asset where play was stopped, the bookmark being unique to the first user.

17. The non-transitory computer-readable medium of claim 15, further comprising:

receiving a request to edit the at least one first option; and editing the at least one first option in response to the received request to edit the at least one first option.

18. The non-transitory computer-readable medium of claim 17, wherein receiving the request to edit the at least one first option comprises receiving the request to edit the at least one first option after the asset was recorded.

19. The non-transitory computer-readable medium of claim 15, wherein receiving the first request to record the asset, the first request being associated with the first user and including the at least one first option, comprises receiving the first request wherein the at least one first option comprises instructions for the delete options for the asset.

20. The non-transitory computer-readable medium of claim 15, wherein receiving the first request to record the asset, the first request being associated with the first user and including the at least one first option, comprises receiving the first request wherein the at least one first option comprises instructions on at least one of the following: time before the asset to record and time after the asset to record.

21. The non-transitory computer-readable medium of claim 15, wherein receiving the first request to record the asset comprises receiving the first request to record the asset comprising an on demand program.

22. The non-transitory computer-readable medium of claim 15, wherein receiving the first request to record the asset comprises receiving the first request to record the asset comprising a linear television program.

23. A system for providing personalized recordings, the system comprising:

a memory storage; and a processing unit coupled to the memory storage, wherein the processing unit is operative to:

receive a first request to record an asset on a recorder located in a multi-room recording environment, the first request being associated with a first user and including at least one first option specified by the first user, wherein the at least one first option comprises instructions for deleting the asset;

receive a second request to record the asset on the recorder, the second request being associated with a second user from the multi-room recording environment and including at least one second option specified by the second user, wherein the at least one second option comprises instructions for deleting the asset, wherein the at least one second option is different from the at least one first option;

record a single instance of the asset on the recorder, wherein the asset is accessible to both the first user and the second user through the multi-room environment, wherein recording the single instance of the asset comprises recording the single instance of the asset consistent with the at least one first option and the least one second option;

display a my recordings list associated with the first user, the my recordings list associated with the first user indicating the asset and the at least one first option associated with the asset, wherein displaying the at least one option associated with the asset comprises a delete option comprising at least one of a manual delete option and an auto delete option receive, in response to the displayed my recordings list associated with the first user, a request to play the asset;

play, in response to the received request to play the asset, the asset consistent with the at least one first option;

receive a request to stop playing the asset;

create a bookmark corresponding to a point in the asset where play was stopped, the bookmark being unique to the first user;

receive a request to edit the delete option after the asset was recorded; and edit the delete option in response to the received request to edit the delete option.

* * * * *